United States Patent [19]

Kohler et al.

[11] 4,102,443
[45] Jul. 25, 1978

[54] DISC MOUNTING RING

[75] Inventors: William H. Kohler, Delaware, Ohio; James P. Mulder, Oakland; Michael C. Meslink, Ramsey, both of N.J.

[73] Assignee: Abex Corporation, New York, N.Y.

[21] Appl. No.: 826,443

[22] Filed: Aug. 22, 1977

[51] Int. Cl.² .............................................. F16D 65/10
[52] U.S. Cl. .............................. 188/218 XL; 301/6 E
[58] Field of Search ............... 188/18 A, 73.1, 218 A, 188/218 XL, 59; 192/107 R; 295/33; 301/6 E

[56] References Cited
U.S. PATENT DOCUMENTS

| 2,233,594 | 3/1941 | Eksergian | 188/218 XL |
| 3,295,641 | 1/1967 | Eaton et al. | 188/218 XL |

FOREIGN PATENT DOCUMENTS 1,151,060  5/1969  United Kingdom .......... 188/218 XL Primary Examiner—Duane A. Reger
Attorney, Agent, or Firm—David A. Greenlee; Thomas S. Baker, Jr.

[57] ABSTRACT

A mechanism for mounting a brake disc on a rotatable member using a plurality of mounting bolts, which mechanism includes a mounting ring secured against radial movement and interposed between the bolts and the disc which permits radial expansion of the disc without transmitting the disc movement to the mounting bolts.

5 Claims, 6 Drawing Figures

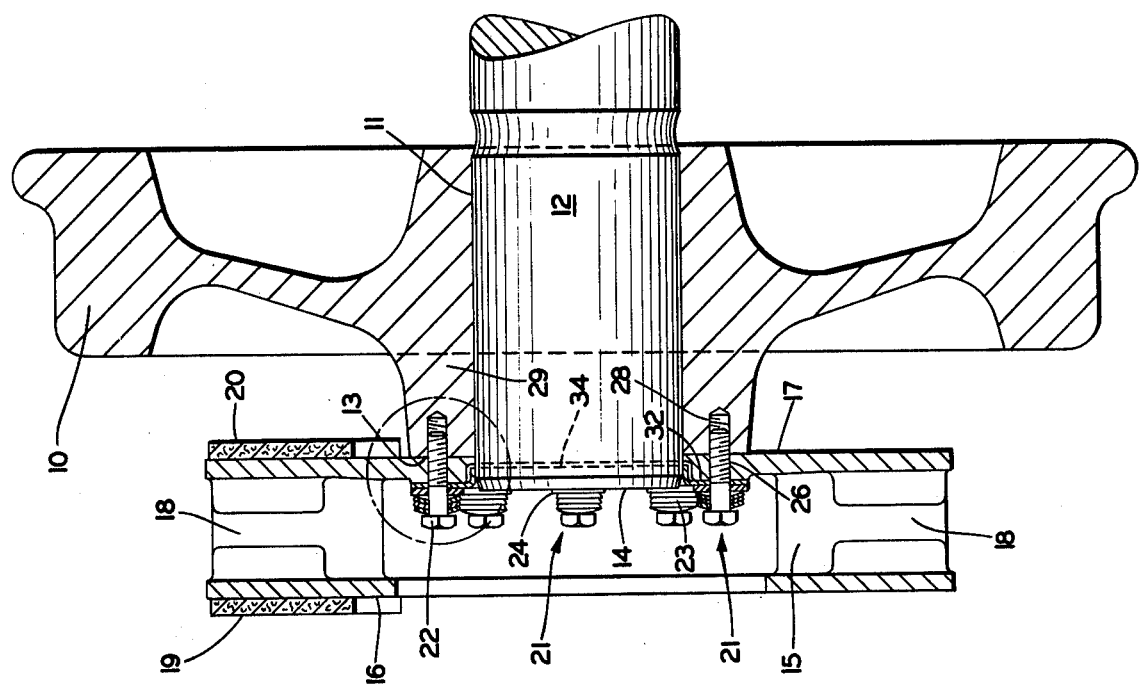
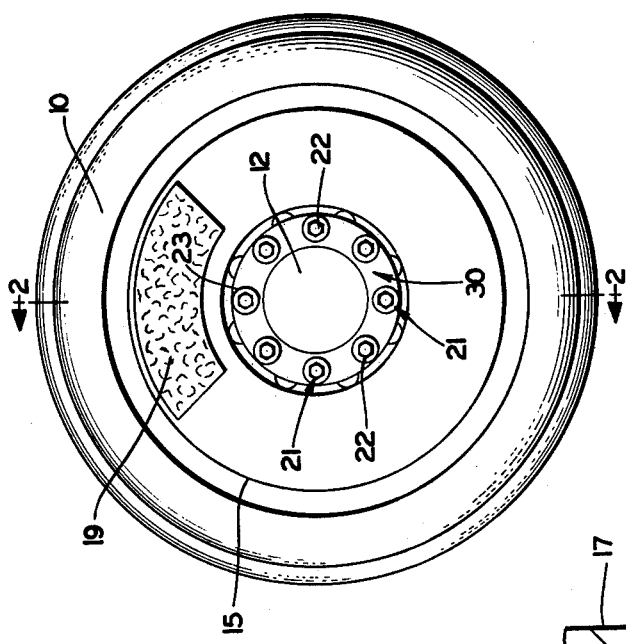
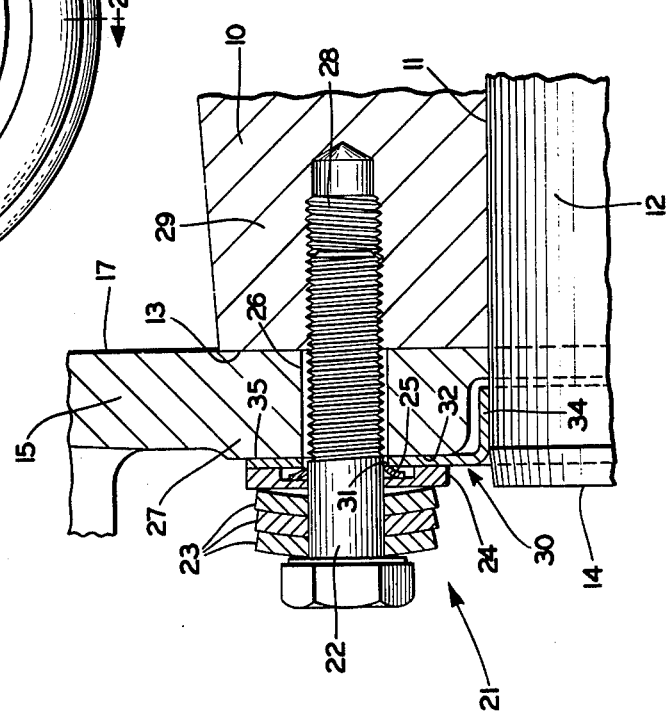

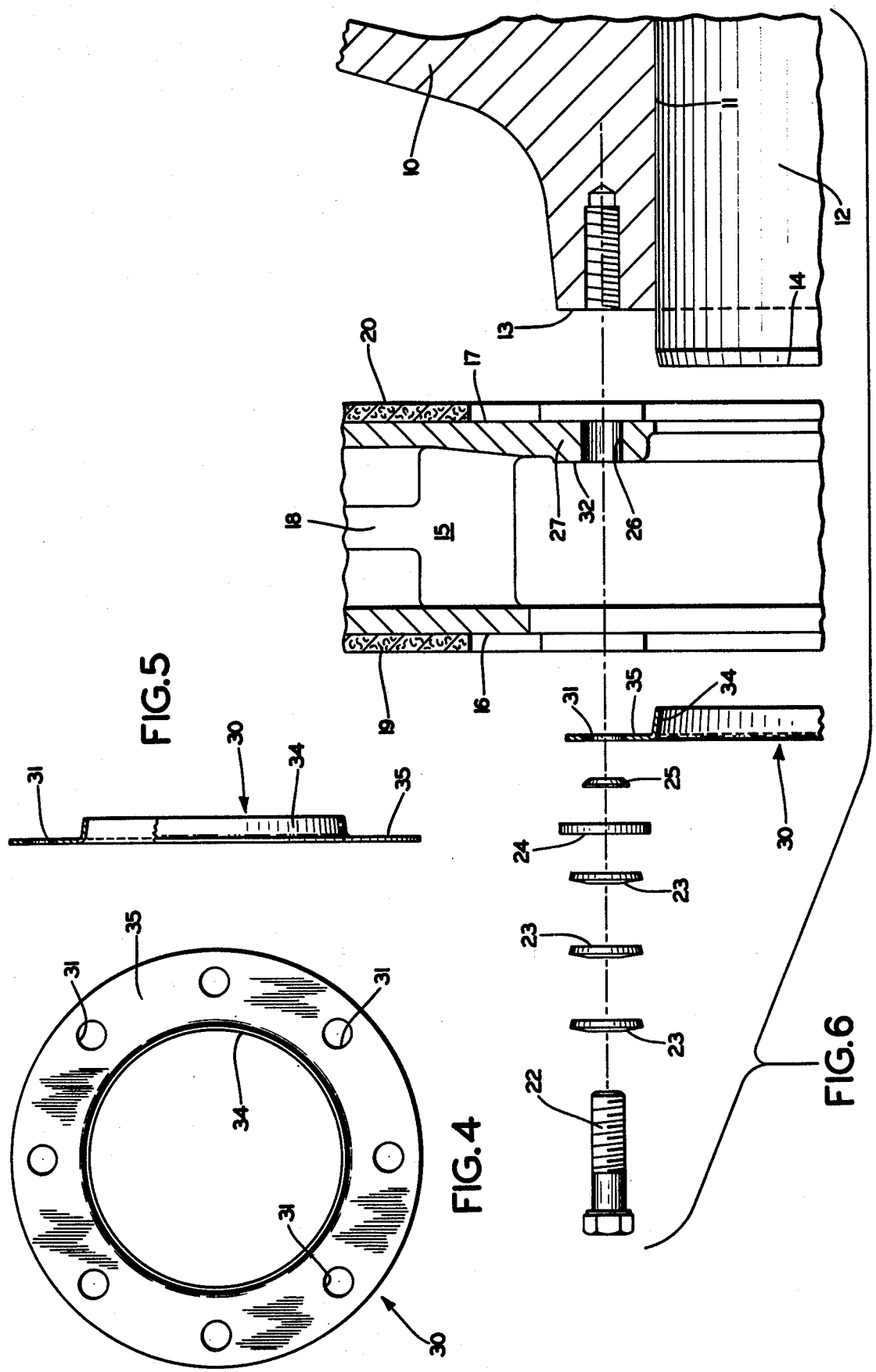

DISC MOUNTING RING

BACKGROUND OF THE INVENTION

1. Field of the Invention

This invention relates to a mechanism for attaching a brake disc to a wheel.

2. Discussion of the Problem

In a disc brake mechanism, a cylindrical metallic disc, which has a pair of smooth, flat, parallel surfaces, is rigidly attached to a wheel. A caliper assembly, which has a pair of disc brake pads, is rigidly mounted on a vehicle frame surrounding a section of the disc such that each pad is adjacent one of the surfaces on the disc. To stop the vehicle, the caliper assembly is actuated, for example by high pressure hydraulic fluid, to clamp the brake pads against the disc surfaces and thereby brake the wheel.

When the brake pads are clamped against the disc a great deal of heat is generated. This heat causes radial thermal expansion of the disc, which moves relative to the wheel, which experiences little temperature change. Since the disc expands and contracts during each braking cycle, the disc mounting mechanism must accommodate this relative movement between the disc and wheel without loosening and without causing undue stress and wear of the elements. Consequently, a direct axial attachment of the disc to the wheel by bolts is not adequate, since disc thermal expansion will exert cyclical bending forces on the bolts and ultimately cause failure through fatigue.

In one of applicants' early designs, elongated holes were provided in the disc to accommodate the cyclical thermal radial expansion and contraction. Each bolt contained a stack of belleville washers adjacent the bolt head and a hardened washer engaging the disc. The belleville washers were provided to maintain adequate bolt torque on the disc despite wear caused by movement of the disc relative to the hardened washer. Upon testing, it was found that the disc did not slide on the hardened washers, but rather the frictional forces between the washer and disc, due to the forces of bolt torque, as maintained by the belleville washers, caused the head of the bolt to move with the disc. Thus, the bolt was bending. It was learned that the cyclical bending was fatiguing the bolts and reducing bolt life to a point significantly below the design life of the disc. The tests also showed that after a number of braking cycles the bolt moved very slightly in and out of the threaded bore in the wheel. This indicated that the threads were wearing. Consequently, this design was unacceptable.

3. Description of the Prior Art

One known method of attaching a disc to a wheel is to provide flexible arms which attach at one end to the disc and at the other end to the wheel. The problem with this design is that it is complex, costly and bulky.

Another known design for attaching a disc to a wheel uses a two-part disc. The disc provides an outer braking ring and an inner fastening ring which is rigidly attached to the wheel. The outer braking ring and the fastening ring are connected by spring loaded, radial pins. In this way, the outer braking ring is isolated from the fastening ring. A problem with such design is that it is quite expensive.

Applicants have devised a mechanism to secure a brake disc to a wheel which accommodates cyclical disc thermal expansion without fatiguing the mounting bolts which is simple and inexpensive.

SUMMARY OF THE INVENTION

Applicants' mechanism for mounting a disc on a wheel utilizes a plurality of equally spaced bolts. The bolts pass through elongated holes near the hub of the disc and engage threaded bores in the wheel. Each bolt has an assembly which contains a stack of belleville washers, a hardened washer and a spring clip retainer to maintain a predetermined bolt torque to clamp the disc to the wheel.

Additionally, the mechanism includes a thin, flat, metal mounting ring which is interposed between the bolt washers and outer surface of the disc and is piloted on the wheel's axle. Each bolt assembly engages the mounting ring which is radially fixed and thus isolates the bolt assemblies from movement of the disc. Since the disc can move relative to the wheel without causing corresponding movement of the hardened and belleville washers, the washers do not apply a bending stress to the bolts.

DESCRIPTION OF THE DRAWINGS

FIG. 1 is a front view of a disc mounted on a wheel according to the instant invention;

FIG. 2 is a sectional view taken along line 2—2 of FIG. 1;

FIG. 3 is an enlarged detail of the encircled portion of FIG. 2;

FIG. 4 is a front view of the mounting ring of the instant invention;

FIG. 5 is a side view, partially in section, of the mounting ring of FIG. 4; and FIG. 6 is an exploded view of a disc mounting assembly.

DESCRIPTION OF THE PREFERRED EMBODIMENT

Referring to FIGS. 1 and 2, a metal wheel 10, such as is used on a rail transit vehicle, is shown pressfitted onto the outer surface 11 of an axle 12. The axle 12 projects beyond the flat outermost surface 13 of the hub of the wheel 10 and terminates with an end surface 14. A cast metallic brake disc 15 having a pair of machined, parallel, flat surfaces 16, 17, which are joined by a plurality of ribs 18, is attached to the wheel 10. The disc 15 is part of a disc brake system which includes a caliper assembly, not shown. The caliper assembly carries a pair of disc brake pads 19, 20 adjacent the disc surfaces 16, 17, respectively. When the caliper assembly is actuated, the disc brake pads 19, 20 are moved to engage the disc surfaces 16, 17 to clamp the disc 15 therebetween and thereby brake the wheel 10.

When the brake pads 19, 20 are clamped against the disc surfaces 16, 17 for braking, the resulting friction generates heat which greatly increases the temperature of the disc 15. The disc 15 may reach a temperature of 800° F. As the temperature of the disc 15 increases, the disc expands radially. After braking, the disc cools and contracts. Consequently, the disc 15 must be attached to the wheel 10 in a manner which will accommodate the thermal expansion and contraction of the disc 15.

A plurality of bolt assemblies 21, each of which includes a bolt 22 with a stack of belleville washers 23 and a hardened flat washer 24 all of which are retained by a spring clip 25, which is recessed in the hardened washer 24, are part of the mechanism which fastens the disc 15 to the wheel 10. Each bolt 22 passes through one of a plurality of equally spaced holes 26 in the hub 27 of the disc 15 into mating threaded bores 28 in the hub 29 of the wheel 10 to clamp the flat surface 17 of the disc 15 against the flat surface 13 on the wheel 10. In order to accommodate the expansion and contraction of the disc 15, the holes 26 in the hub 27 are radially elongated so that the disc 15 may move radially relative to the wheel 10 and bolt assemblies 21. If the holes 26 were not elongated and the bolts 22 fit tightly therein, the disc 15 would exert an unacceptably high stress on the bolts 22 when it underwent thermal expansion during braking, which could shear the bolts. Likewise, the fixed bolts 22 could overstress the disc 15 in the area of the bolt holes 26 and crack it. Since the holes 26 are elongated only in the radial direction, the disc 15 cannot rotate relative to the wheel 10 and the bolt assemblies 21.

An important part of the disc fastening mechanism, shown in FIGS. 2-6, is a mounting ring 30 which is interposed between a disc surface 32 and hardened washer 24. Ring 30 has a plurality of holes 31, which are aligned with respective holes 26 and bores 28, in the brake disc 15 and the wheel 10 respectively, and is clamped against the outer surface 32 of the disc 15 by the bolt assemblies 21.

The mounting ring 30 has a cylindrical inner flange 34 which engages the outer surface 11 of the axle 12 and pilots the ring 30 thereon. The piloting of ring 30 on the axle 12 prevents radial movement of the mounting ring 30. Consequently, when the disc 15 moves radially, the disc surface 32 slides on the inner face 35 of the ring 30, which remains stationary. Therefore, the disc 15 can move radially without transmitting this movement to the bolt assemblies 21 and does not cause bending of the bolts 22. If the bolt assemblies 21 were used to secure the disc 15 against the wheel 10 without the mounting ring 30, or if the ring 30 could move with the disc 15, movement of the disc hub 27 would cause corresponding movement of the bolt assemblies 21 and consequent bending of the bolts 22. This bending would cause premature failure of the bolts 22 due to fatigue.

Radial movement of the disc 15 causes wear between the surface 17 of the disc hub 27 and the surface 13 on the wheel 10 and between the outer surface 32 on the disc hub 27 and the inner face 35 on the mounting ring 30. The belleville washers 23 maintain tension on the bolts 22 to prevent loosening of the bolts 22 caused by this wear.

Although a preferred embodiment of the invention has been illustrated and described, it will be obvious to those skilled in the art that various changes may be made in the details and arrangements of the parts without departing from the spirit and scope of the invention as it is defined in the claims hereto appended.

What is claimed is:

1. A mechanism for mounting a brake disc on a rotatable member by mounting bolt assemblies, wherein the member has a plurality of threaded bores for receiving mounting bolts and the disc has a plurality of mating holes for receiving the mounting bolts, characterized in that the disc mounting holes are radially elongated to permit radial movement of the brake disc relative to the mounting bolts, that the bolt assemblies include spring means mounted on said bolts for tensioning the bolts and that a mounting ring is provided between the brake disc and the spring means to isolate the disc from the spring means and prevent transmittal of radial movement of the disc to the spring means and mounting bolts.

2. The mechanism recited in claim 1, including means for preventing radial movement of the mounting ring.

3. The mechanism recited in claim 2, wherein said preventing means includes a rim on said mounting ring which is piloted on the rotatable member.

4. The mechanism recited in claim 1, wherein said spring means includes a stack of belleville washers.

5. The mechanism recited in claim 4, including means for retaining the belleville washer stack on the bolts.

* * * * *